July 25, 1933. A. W. MOLINARE 1,919,447
SEMITRAILER AND AUXILIARY SUPPORT
Original Filed Aug. 5, 1931 5 Sheets-Sheet 1
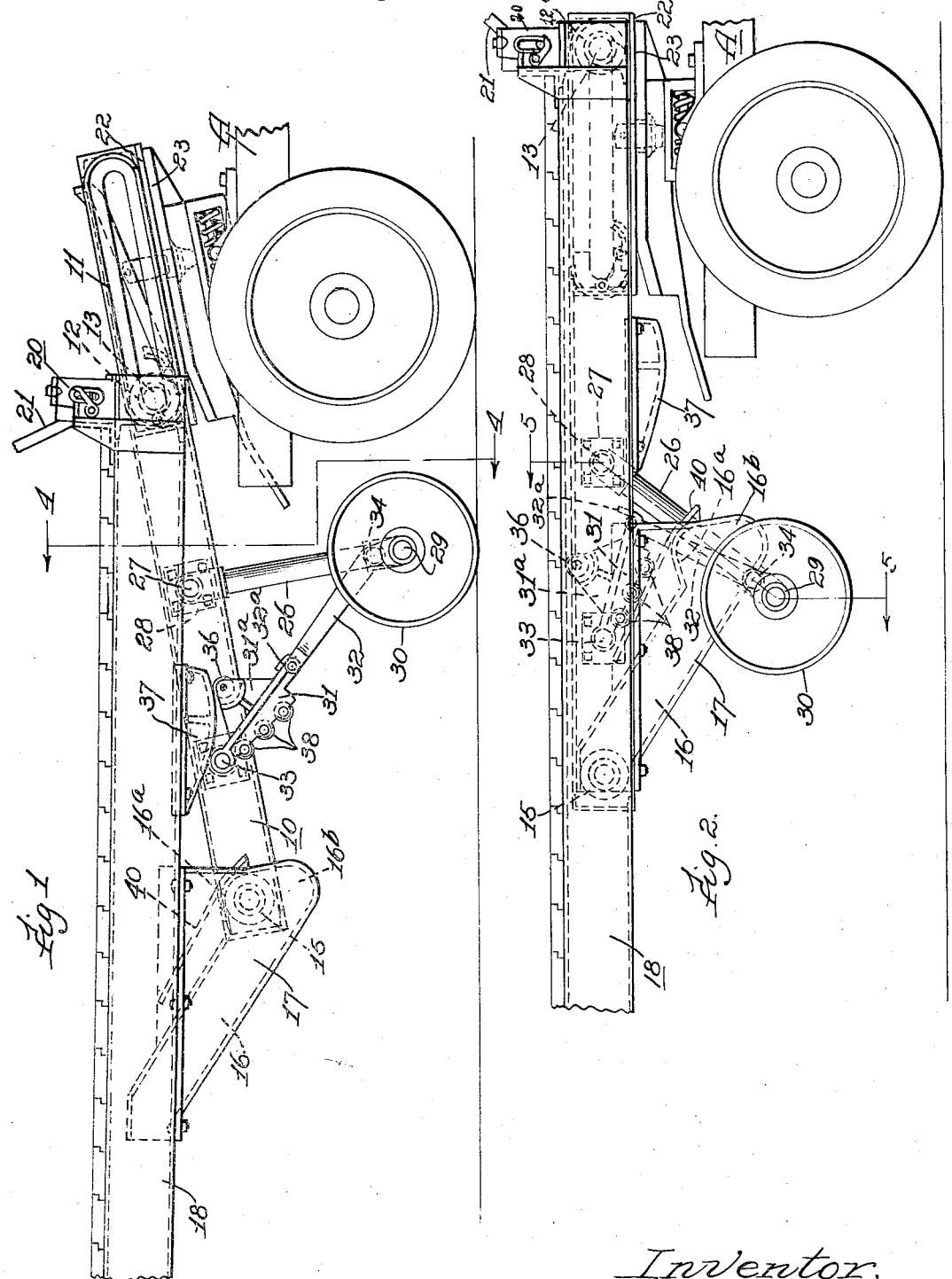

July 25, 1933.  A. W. MOLINARE  1,919,447
SEMITRAILER AND AUXILIARY SUPPORT
Original Filed Aug. 5, 1931  5 Sheets-Sheet 2
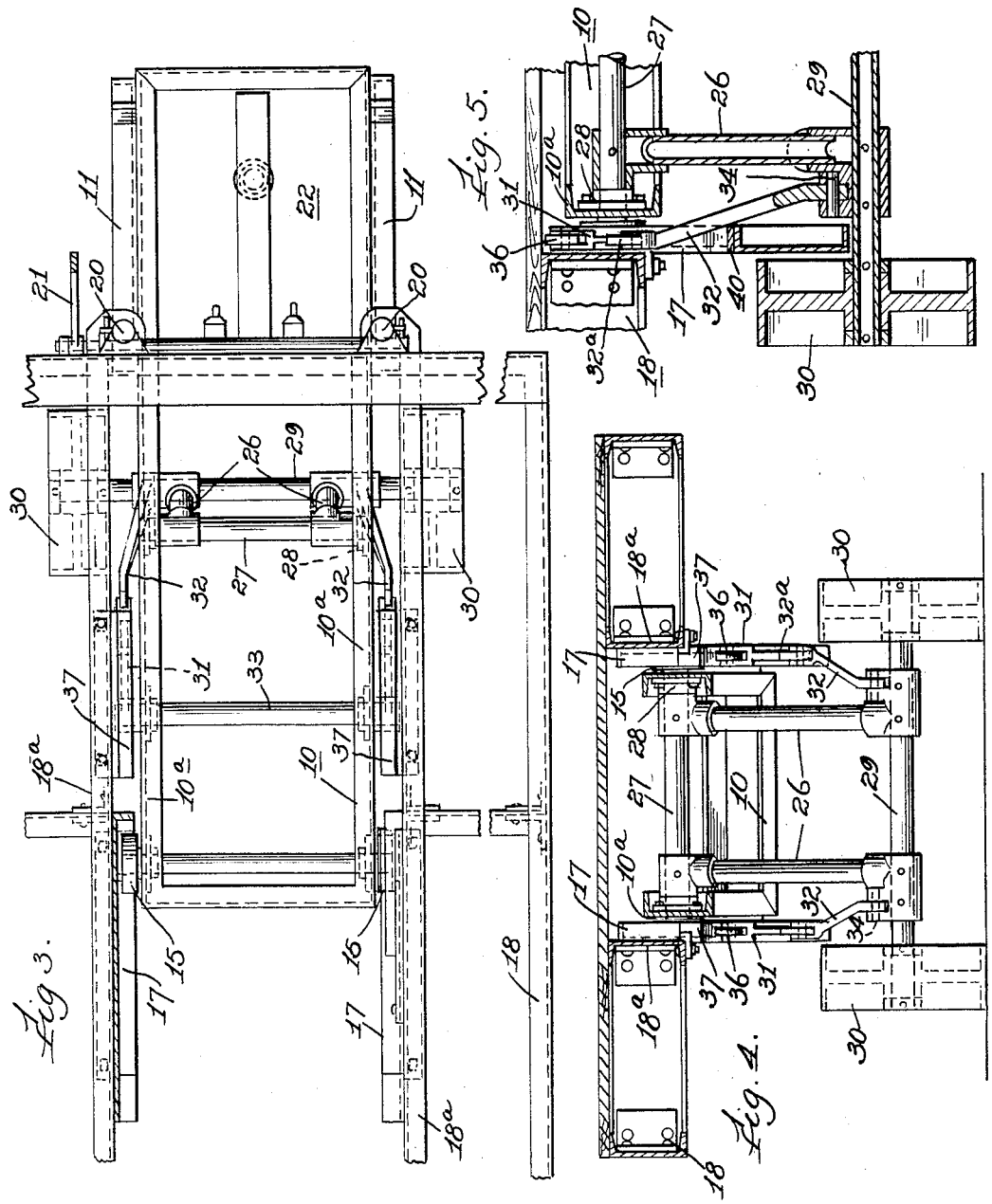

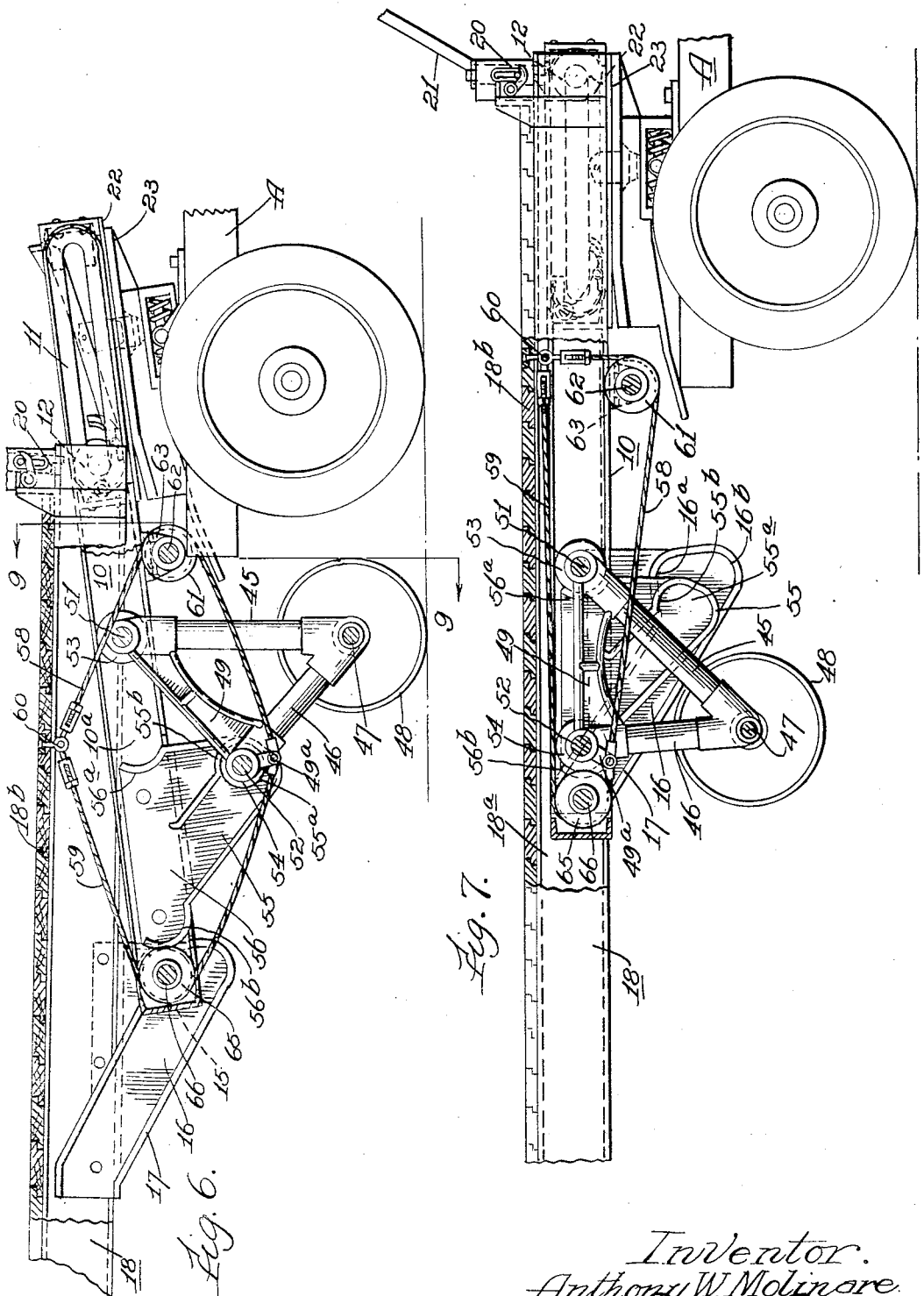

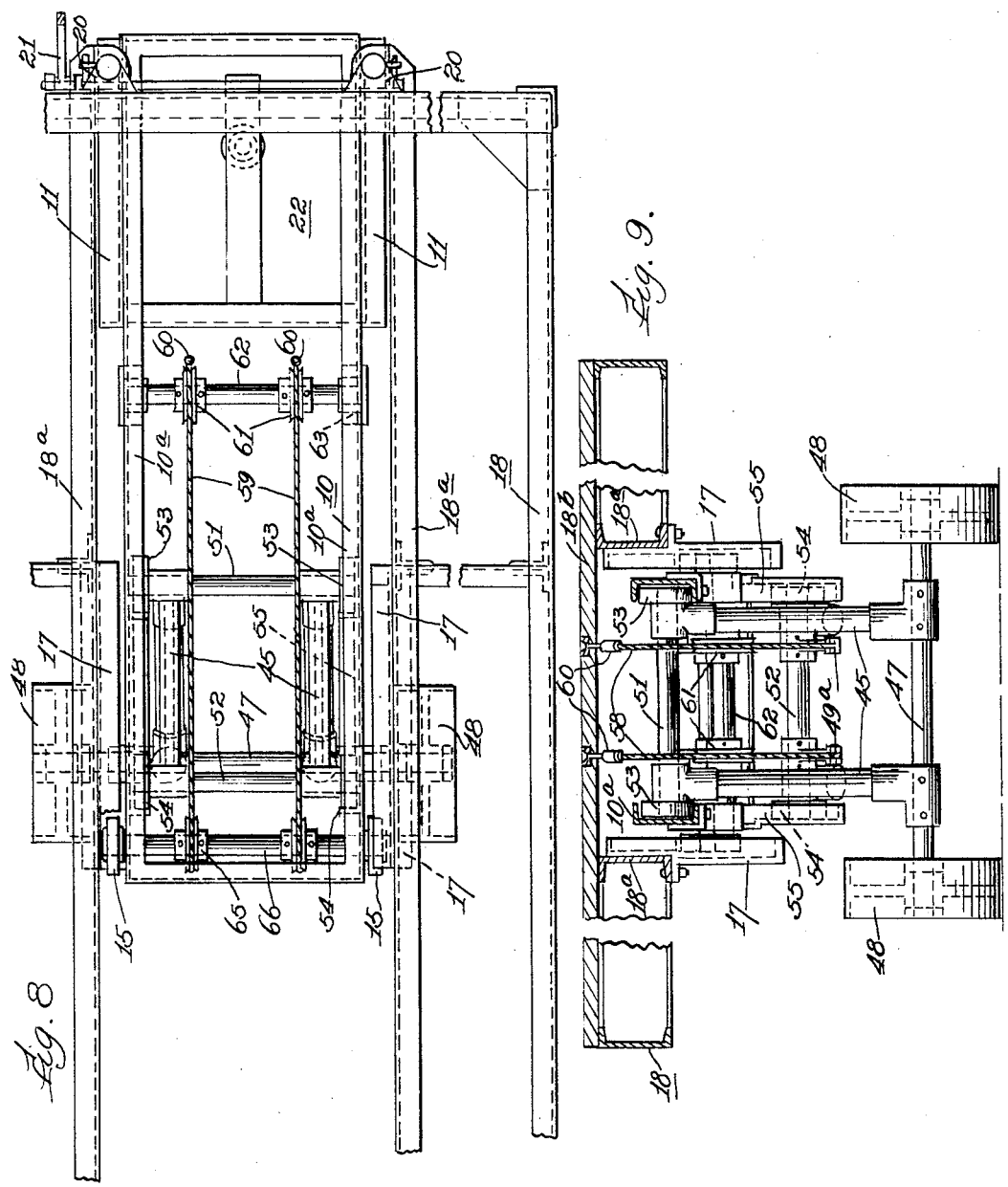

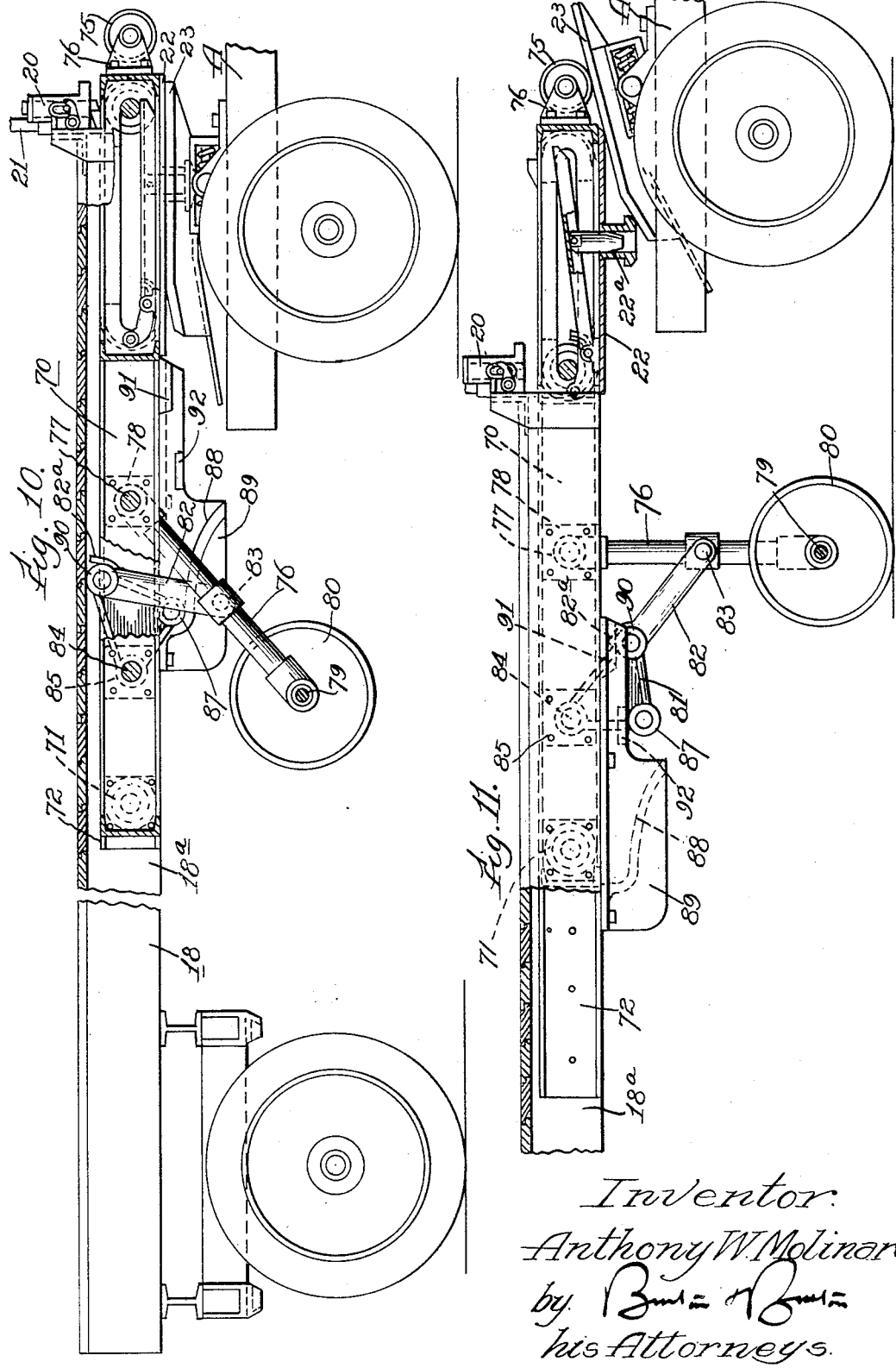

Patented July 25, 1933

1,919,447

UNITED STATES PATENT OFFICE

ANTHONY W. MOLINARE, OF OAK PARK, ILLINOIS, ASSIGNOR TO HIGHWAY TRAILER COMPANY, OF EDGERTON, WISCONSIN, A CORPORATION OF WISCONSIN

SEMITRAILER AND AUXILIARY SUPPORT

Application filed August 5, 1931, Serial No. 555,200. Renewed February 29, 1932.

This invention relates to semi-trailers, and more particularly to the temporary load supporting means for semi-trailers provided for sustaining the load at the forward end of the trailer when it is detached from the tractor.

In the construction shown in Patents No. 1,783,087 and No. 1,785,697 issued to Harry W. Helms, November 25, 1930, and December 16, 1930, respectively, there is employed a longitudinally movable auxiliary frame on which is carried adjacent the forward end the upper fifth wheel member and supporting legs rigidly associated therewith adjacent the rear end of said frame. The auxiliary frame is so mounted as to permit longitudinal movement forwardly and rearwardly relatively to the trailer main frame incident to coupling or uncoupling respectively of the tractor and trailer units, and by virtue of such movement the supporting legs on the auxiliary frame are carried into or out of operative position due to the tilting of said auxiliary frame about a transverse axis adjacent the forward end of the trailer.

The present invention represents certain refinements and improvements over the Helms structures, and has for its object the provision of temporary supporting means carried by the auxiliary frame and arranged for movement relative thereto incident to the movement of the auxiliary frame relative to the trailer main frame; said supporting means being constructed and arranged so as to assume operative position well toward the forward end of the trailer for effectively supporting said forward end of the trailer when the tractor is detached therefrom and thereby prevent "nose-diving" of the trailer when loading or unloading, said means also being adapted to be moved rearwardly, and at the same time upwardly, to inoperative position by the rearward movement of the auxiliary frame incident to the coupling of the tractor and trailer, so that the support shall be carried far enough in the rear of the tractor to insure ample clearance for articulation of the tractor and trailer. The invention consists in certain elements and features of construction in combination, as herein shown and described and as indicated by the claims.

In the drawings:

Figure 1 is a fragmentary side elevation of the tractor trailer combination, the trailer being provided with temporary supports embodying the present invention and being shown disposed in operative position with the tractor ready to be either withdrawn from the trailer or to be backed rearwardly for completing the coupling operation preparatory to shifting the auxiliary frame rearwardly and causing movement of the supporting legs to inoperative position.

Figure 2 is a view similar to Figure 1 showing the tractor and trailer in coupled relation with the temporary supports disposed in inoperative position.

Figure 3 is a fragmentary plan view of the trailer with the flooring members omitted and with the supporting means disposed in inoperative position.

Figure 4 is a transverse section taken substantially as indicated at line 4—4 on Figure 1.

Figure 5 is an enlarged partial vertical section taken at line 5—5 on Figure 2.

Figures 6 and 7 are views similar to Figures 1 and 2 showing a modified construction for controlling the operation of the legs.

Figure 8 is a plan view (with the flooring members omitted) of the construction shown in Figures 6 and 7.

Figure 9 is a transverse section taken substantially as indicated at line 9—9 on Figure 6.

Figure 10 is a view in side elevation of a modified form of the invention shown adapted to an auxiliary frame which is arranged for movement in a substantially horizontal direction and shown in coupled relation with the tractor and with the supporting means disposed in inoperative position.

Figure 11 is a fragmentary view of the forward end of the trailer and tractor with the supporting means disposed in operative relation and the tractor in position ready to be backed under the forward end of the trailer preparatory to coupling of the vehicle units.

The constructions shown in Figures 1 to 5 and 6 to 9 inclusive, are quite similar to constructions shown in the Helms patents above mentioned wherein the longitudinally movable auxiliary frame indicated at 10 is caused to assume an upwardly tilted position, as seen in Figures 1 and 6 when said frame is moved forwardly preparatory to uncoupling of the tractor and trailer, and at which position the temporary supports are caused to assume operative load-supporting position. In each of these constructions the auxiliary frame is supported at its forward end by the tracks indicated at 11, cooperating with rollers, 12, journaled on a cross shaft, 13, supported adjacent the forward end of the trailer, while the rear end of the auxiliary frame is provided with guide rollers, 15, at opposite sides thereof, which are adapted to travel in a confining guideway indicated at 16, formed in a cast member, 17, secured to the under side of an intermediate frame member, 18$^a$, of the trailer main frame, 18. As may be seen in Figures 3 and 8, these intermediate frame members, 18$^a$, extend longitudinally and are disposed in close proximity to the side members, 10$^a$, of the frame, 10. It is to be understood that said frame, 10, is locked in the main frame, 18, by suitable latch members indicated generally at 20, which are operated substantially as disclosed in either of the Helms patents above referred to. It may be here mentioned that the latch members are adapted to be manually released by the control lever indicated at 21, which simultaneously sets the trailer brakes (not shown). It is to be further understood that the auxiliary frame is provided with coupling mechanism substantially similar to that disclosed in the Helms Patent No. 1,785,697, which includes safety devices for precluding shifting of the auxiliary frame rearwardly, and thereby moving the supporting legs out of operative position until the fifth wheel members, 22 and 23, on the trailer and tractor respectively, are positively locked together. As shown in the drawings, the lower fifth wheel member, 23, carried on the tractor indicated generally at A, is rockably mounted about a transverse axis and normally assumes a rearwardly tilted position.

It will be manifest that, as in the Helms constructions above referred to, the path of the auxiliary frame when moved longitudinally in either coupling or uncoupling the tractor and trailer, is definitely controlled by its rollers, 15, in the cast guideways, 16; and when said frame is extended to its forwardmost position the rollers, 15, are caused to seat against the flanges, 16$^a$, of the pockets, 16$^b$, at the lower ends of the guideways, 16, in which position of the parts the trailer is supported when detached from the tractor. When the auxiliary frame is backed rearwardly relative to the trailer main frame it assumes a substantially horizontal position or a position at least parallel with the main frame of the trailer, as seen in Figures 2 and 7 respectively.

Referring now particularly to the temporary supporting means shown in Figures 1 to 5, said means includes a pair of supporting legs, 26, the upper ends of which are rigidly secured to a transverse shaft, 27, journaled in bearings, 28, on the inner sides of the side members, 10$^a$, of the auxiliary frame, as seen in Figures 4 and 5. The lower ends of said legs are rigidly secured to a transverse axle, 29, the outer ends of which carry the ground-engaging wheels indicated at 30. Said wheels may be swung about the axis of the pivot shaft, 27, by a pair of jointed control links, 31 and 32, provided at opposite sides of the auxiliary frame, the upper link members, 31, being pivotally mounted at their upper ends on a transverse shaft, 33, while the lower links, 32, have their lower end pivotally connected at 34 to the lower end of the adjacent leg, 26. The upper control link, 31, is formed at its upper side with an offset bracket, 31$^a$, in which is journaled a roller, 36, adapted to cooperate with a cam track, 37, rigidly secured to the under side of the intermediate members, 18$^a$, of the trailer frame, while the lower side of the link, 31, has journaled thereon a plurality of rollers, 38, which are adapted to engage an inclined cam track, 40,—the latter being shown formed integrally with the cast guideway member, 17, carried on the intermediate frame members, 18$^a$. It will be understood that when the auxiliary frame is telescoped rearwardly into the main frame in the coupling of the tractor and trailer, the roller, 36, by virtue of its engagement with the cam track, 37, maintains control links, 31 and 32, in braced relation until the frame has shifted rearwardly to the point where the rollers, 38, engage the cam track, 40. Continued rearward movement wherein the rear end of the auxiliary frame is traveling in an upward direction causes the rollers, 38, by virtue of their engagement with the cam track, 40, to swing the upper link, 31, in counter-clockwise direction about its pivot, 33, breaking the hinge joint between the brace members, 31 and 32, and thereby raising the supporting wheels, 30, out of engagement with the ground by causing the supporting legs, 26, to swing rearwardly about the transverse shaft, 27, to the position seen in Figure 2. As may be seen in the drawings, this carries the supporting means a substantial distance rearwardly of the end of the tractor so as to insure ample clearance for free articulation of the tractor and trailer when coupled.

In the uncoupling of the tractor and trailer, it will be manifest that due to the weight of the temporary supporting means and because the wheels and the supporting legs are disposed out of plumb, there will be a natural tendency for the supporting legs to swing downwardly about the pivot shaft, 27, under the influence of gravity, but at the same time under the control of the rollers, 38, engaged with the cam track, 40; and of course after the auxiliary frame has been moved forwardly a sufficient amount so that the rollers, 38, are just about free from the control of the cam track, 40, the roller, 36, is brought into contact with the cam track, 37, which may be understood to be so shaped as to positively force or cramp the brace member, 31, in a downward direction so that the brace members, 31 and 32, will assume a substantially straight line position, as seen in Figure 1. To insure against possible buckling of the brace members, 31 and 32, in a downward direction at the hinge, the brace member, 32, is provided at its upper end with a lug, 32ª, overlapping the hinge connection and engaging the brace member, 31.

Referring now to the modified construction shown in Figures 6 to 9, the auxiliary frame is supported and controlled in its path of movement substantially as that above described, and as also disclosed in the Helms patents. In this construction the supporting means is movable bodily in relation to the auxiliary frame and includes a triangular shaped supporting structure comprising a main strut, 45, and a diagonal brace, 46, which are rigidly secured at their lower ends to provide journal support for a transverse axle, 47, carrying at its outer ends ground-engaging wheels, 48. The upper ends of the strut and brace members, 45 and 46, are rigidly connected by a cast bracket, 49, which is formed to provide journal support for transverse shafts, 51 and 52, whose outer ends are provided with rollers, 53 and 54 respectively. The rollers, 53, are confined for movement in longitudinal guideways formed by the inturned flanges of the channel-shaped side members, 10ª, of the auxiliary frame, while each of the rollers, 54, is confined for movement in a cast guideway, 55, which slopes in a forward and downward direction, and which is rigidly secured to the side of the web of the side member, 10ª, of the auxiliary frame.

The lower end of the cast guideway, 55, is formed with a pocket, 55ª, of contour somewhat similar to the pocket, 16ᵇ, of a cast member, 17, controlling the path of movement of the rear end of the auxiliary frame, and is also formed with a flange, 55ᵇ, serving as a support against which the rollers, 53, seat when the supporting means is disposed in operative position, as in Figure 6. The guideway, 55, terminates at its upper end in a rounded seat, 56ª, and the opposite end of said cast member is also provided with a similarly formed seat, 56ᵇ, said seats serving as stops for the rollers, 54 and 53, respectively, when the supporting structure is disposed at inoperative position, as shown in Figure 7.

The supporting means is moved in relation to the auxiliary frame by two pairs of oppositely extending cables, 58 and 59, both of which are positively anchored at their upper ends to a fitting, 60, rigidly secured to the under side of the flooring members, designated at 18ᵇ. The cables, 58, are trained about spaced sheaves, 61, which are mounted on a transverse shaft, 62, journaled in bearing brackets, 63, on the auxiliary frame side members, 10ª; said cables continuing about said sheaves and having their opposite ends rigidly connected to a lug, 49ª, of the triangular supporting means just below the pivot shaft, 52; these lugs also serve as the point of positive connection for the other cables, 59, which are trained rearwardly over the sheave wheels, 65, carried on the transverse shaft, 66, which also provides the support for the control rollers 15, at the rear end of the auxiliary frame. Thus when the auxiliary frame is pulled forwardly incident to uncoupling of the tractor and trailer, substantially simultaneously with the downward movement of the rear end of the auxiliary frame, the triangular supporting truss carrying the ground-engaging wheels, 48, commences to move forwardly in respect to the auxiliary frame due to the shifting of the cable, 58, because it is trained around sheave members which are moved forwardly with said auxiliary frame; and when said frame has reached its forward limit and with the rollers, 15, seated against the flange, 16ª, of the pockets, 16ᵇ, of the cast guide member, 17, it will be seen that the roller, 54, has also arrived at the lower end of the guideway, 55, and seated against its flange, 55ᵇ, while the roller, 53, has moved a substantial distance forwardly along the channel of the auxiliary frame, in which position the triangular truss is disposed in vertical position and with its ground-engaging wheels in contact with the ground for effectively supporting the forward end of the trailer. Likewise, when the auxiliary frame is backed into the main frame incident to coupling of the tractor and trailer, the cables, 59, then come into play and are tensioned by the action of the sheave wheels, 65, thereagainst as the rear end of the auxiliary frame is forced rearward, thus pulling the rear end of the triangular truss upwardly and rearwardly until the rollers, 53 and 54, are brought into contact with their respective stops, 56ª and 56ᵇ, respectively, at which position the auxiliary frame has just reached its limit of rearward movement.

The modified construction shown in Figures 10 and 11 is slightly different from the constructions above described, in that the auxiliary frame, 70, is longitudinally movable in substantially horizontal direction. In this construction the forward end of the auxiliary frame is supported in much the manner as in the above described constructions, while the rollers, 71, at their rear end corresponding to rollers, 15, of the above described constructions, move in horizontally extending guideways, 72, secured to the intermediate frame member, 18ª, of the trailer main frame, 18. It is to be understood that the latching devices and the coupling mechanism, together with the safety device above referred to, are substantially the same as those employed in the two forms of this invention already described. To facilitate the coupling of the tractor and trailer, and to accomplish such coupling with the ease of the constructions above described, it is desirable to provide rollers, 75, journaled in brackets, 76, at the forward end of the auxiliary frame, said rollers being so positioned as to be the first part of the trailer to come into contact with the upper surface of the rearwardly inclined fifth wheel member, 23, of the tractor, A, as it is backed toward the trailer preparatory to coupling. By virtue of this construction the rollers will cause the tractor to gradually assume the load of the trailer, and may also cause lifting of the trailer slightly so as to facilitate the engagement of the king pin, 22ª, on the under side of the upper fifth wheel member of the trailer for engagement in the rearwardly open V-shaped slot in the lower fifth wheel member, 23, of the tractor.

It may be understood that the temporary supporting means for use in connection with the present construction is quite similar to that disclosed in Figures 1 to 5, and includes a pair of supporting legs, 76, mounted at their upper ends on a transverse pivot shaft, 77, journaled in bearing brackets, 78, to the inner side of the web of the side members of the auxiliary frame, 70. The lower ends of these legs, 76, are connected by a transverse axle, 79, the outer ends of which carry ground engaging wheels, 80. The supporting legs, together with the ground-engaging wheels, may be swung about the axis of the shaft, 77, by a pair of control links or brace members, 81 and 82, hingedly connected together, the lower end of the lower member, 82, being pivotally connected at 83, to an intermediate point on the supporting legs, 76, while the upper end of the brace member, 81, is pivotally mounted on a transverse shaft, 84, which is journaled in brackets, 85, on the auxiliary frame. The upper brace member, 81, is formed as a triangular cast member providing a support for a roller member, 87, approximately midway between the effective pivots of said member, and said roller is adapted to cooperate with an inclined cam bracket, 88, which is formed as an integral part of the cast member, 89, which is secured to the under side of the intermediate frame member, 18ª.

The hinge pivot between the brace members, 81, and 82, also carries a roller, 90, which is adapted to cooperate with a fixed shelf, 91, which is integral with the cast member, 89, and is dimensioned and formed for crowding the upper brace member, 81, downwardly about the axis of the pivot shaft, 84, so that the pivots of the respective brace members, 81 and 82, are in substantially a straight line, as seen in Figure 11. It may be understood that this shelf portion, 91, may be of sufficient length to maintain the brace members, 81 and 82, in operative position while the auxiliary frame is being telescoped rearwardly in the main frame until the roller, 87, of the upper brace member, 81, comes in contact with its cam track, 88, and it will be manifest that the continued rearward movement of the auxiliary frame will cause the roller, 87, to ride up the inclined cam bracket, 88, thereby swinging the brace member, 81, upwardly about the axis of the pivot shaft, 84, and thus buckling the brace members, 81 and 82. This buckling causes swinging of the supporting legs, together with the ground-engaging wheels, rearwardly about the pivot shaft, 77, to the position as seen in Figure 10.

When the auxiliary frame is pulled forwardly relatively to the main frame, 18, preparatory to uncoupling of the tractor and trailer, the supporting legs will tend to swing downwardly into operative position under the force of gravity, and of course, under the control of the roller, 87, and cam track, 88. But when the auxiliary frame has been moved forwardly to the point where the roller, 87, is disengaged from its cam track, the roller, 90, has come into position for engagement with the shelf, 91, and is thereby positively forced or cramped downwardly for disposing the brace members, 81 and 82, substantially as seen in Figure 11. The cast member, 89, on the member, 18ª, of the trailer main frame is also formed with an intermediate shelf, 92, which is adapted to be engaged on the under side by the roller, 87, after said roller is moved out of engagement with its cam track, 88. The purpose of this additional contact or engagement with the lower brace member, 81, is to insure maintaining the brace members in extended position, and to prevent any tendency to buckling of the brace links due to looseness in the pivotal connections. The lower brace member, 82, is also provided with an offset lug, 82ª, which overlaps the pivotal connection between the brace members, 81 and 82, and engages the brace member, 81, for preventing buckling of the brace members in a downward direction.

Heretofore, detachable semi-trailers, automatic tractor and trailer combinations, and semi-automatic tractor and trailer combinations, have all involved the difficulty of properly supporting the forward end of the trailer when it is detached from the tractor so as to prevent "nose-diving" of the forward end of the trailer when it is being loaded or unloaded. The constructions heretofore employed have all been such as to necessitate carrying the legs so far rearwardly with respect to the forward end of the trailer that there resulted a substantial overhang, and unless the rear end of the trailer was made rather massive, resulting in its being unduly heavy, such trailers have usually required the exercise of extreme caution in the loading and unloading of the vehicles, so as to prevent accidents and injury to equipment and operators. By virtue of the constructions above described, the temporary supporting means for the forward end of the trailer is moved to a position relatively close to the extreme forward end of the trailer when the tractor is uncoupled therefrom and thereby insures adequate support for the vehicle while it is being loaded and unloaded, and precludes any possibility of "nose-diving."

I claim:—

1. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer and adapted for return movement by the coupling of the tractor and trailer; temporary supporting means carried by and movable relative to the auxiliary frame, and means associated with the temporary supporting means and responsive to the relative movement of the auxiliary frame and main frame incident to uncoupling of the tractor and trailer for positively shifting the temporary supporting means forwardly relative to the auxiliary frame to assume a position adjacent the forward end of the trailer at a substantial distance forward of the position normally assumed by said supporting means when disposed in inoperative position, said means being adapted in response to relative movement of the auxiliary frame and main frame in coupling the tractor and trailer for shifting said supporting means rearwardly relative to the auxiliary frame, in inoperative position.

2. In a semi-trailer, the combination of a main frame, an auxiliary frame carried thereby and longitudinally movable relative thereto, means on the auxiliary frame for coupling the trailer to a tractor, said auxiliary frame being adapted for bodily forward movement in a substantially horizontal direction during uncoupling of the tractor and trailer, temporary supporting means carried by and movable relative to the auxiliary frame, and means associated with said temporary supporting means and controlled by the relative movement of the auxiliary frame and main frame, incident to uncoupling of the tractor and trailer, for positively shifting the temporary supporting means downwardly into operative load supporting position.

3. In a semi-trailer, the combination of a main frame, an auxiliary frame carried thereby and longitudinally movable relative thereto, means on the auxiliary frame for coupling the trailer to a tractor, said auxiliary frame being adapted for bodily forward movement in a substantially horizontal direction during uncoupling of the tractor and trailer, temporary supporting means carried by and movable relative to the auxiliary frame, and means associated with said temporary supporting means and controlled by the relative movement of the auxiliary frame and main frame, incident to uncoupling of the tractor and trailer, for positively shifting the temporary supporting means forwardly and downwardly relatively to the auxiliary frame to assume load-supporting position adjacent the front end of the trailer at a substantial distance forward of their inoperative position.

4. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer; temporary supporting means carried by and movable relative to the auxiliary frame, and means associated with said temporary supporting means and controlled by the relative movement of the auxiliary frame and main frame, incident to uncoupling of the tractor and trailer, for positively shifting the temporary supporting means forwardly relative to the auxiliary frame to assume a position adjacent the forward end of the trailer at a substantial distance forward of the position normally assumed by said supporting means when disposed in inoperative position.

5. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer and adapted for return movement by the coupling of the tractor and trailer; temporary supporting means carried by and movable relative to the auxiliary frame, and means associated with the temporary supporting means and responsive to the relative movement of the auxiliary frame and main frame incident to uncoupling of the tractor and trailer for positively shifting the temporary supporting means forwardly relative to the auxiliary frame to assume a position adjacent the forward end of the trailer at a substantial distance forward of the position normally assumed by said supporting means when disposed in inoperative position, said means being adapted in response to relative movement of the auxiliary frame and main frame in coupling the tractor and trailer for shifting said supporting means rearwardly relative to the auxiliary frame, in inoperative position.

6. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer and adapted for return movement by the coupling of the tractor and trailer; temporary supporting means carried by and movable relative to the auxiliary frame, means associated with the temporary supporting means and responsive to the relative movement of the auxiliary frame and main frame, incident to uncoupling of the tractor and trailer, for causing the temporary supporting means to move forwardly relative to the auxiliary frame and assume a position adjacent the forward end of the trailer at a substantial distance forward of the position normally assumed by said supporting means when disposed in inoperative position, and separate means associated with said temporary supporting means and adapted in response to return movement of the auxiliary frame, incident to coupling of the tractor and trailer for shifting said supporting means rearwardly relative to the auxiliary frame, in inoperative position.

7. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer; temporary supporting means associated and bodily movable with the auxiliary frame and longitudinally movable relatively to said auxiliary frame, and means associated with said temporary supporting means and controlled by the relative movement of the auxiliary frame and main frame, incident to uncoupling of the tractor and trailer, for positively shifting the temporary supporting means forwardly relative to the auxiliary frame to assume a position adjacent the forward end of the trailer, at a substantial distance forward of the position normally assumed by said supporting means when disposed in inoperative position.

8. In a semi-trailer including a main frame, an auxiliary frame carried thereby and longitudinally movable relative thereto, and means on the auxiliary frame for coupling the trailer to a tractor, said auxiliary frame being tiltable to assume an upwardly and forwardly inclined position during uncoupling of the tractor and trailer; temporary supporting means carried by and movable relative to the auxiliary frame, and means associated with the temporary supporting means and responsive to the relative movement of the auxiliary frame and main frame incident to uncoupling of the tractor and trailer for positively shifting the temporary supporting means forwardly relative to the auxiliary frame, into operative load-supporting position.

9. In a semi-trailer including a main frame, an auxiliary frame carried thereby and longitudinally movable relative thereto, and means on the auxiliary frame for coupling the trailer to a tractor, said auxiliary frame being forwardly extensible into an upwardly inclined position during uncoupling and separation of the tractor and trailer, and being adapted for return movement by the coupling of the tractor and trailer; temporary supporting means carried on and movable relative to the auxiliary frame, means responsive to relative extensible movement of the auxiliary frame and main frame incident to uncoupling of the tractor and trailer for positively shifting said supporting means in position, adjacent the front end of the trailer at a substantial distance forward of the position normally assumed in inoperative position, and means adapted to positively shift the supporting means rearwardly relative to the auxiliary frame in inoperative position by the return movement of the auxiliary frame in coupling of the tractor and trailer.

10. In a semi-trailer, the combination of a main frame, an auxilliary frame carried thereby and longitudinally movable relative thereto, means on the auxiliary frame for coupling the trailer to a tractor, said auxiliary frame being adapted for forward longitudinal movement in a substantially horizontal direction during uncoupling of the tractor and trailer, temporary supporting means carried by and movable relative to the auxiliary frame, and means associated with said temporary supporting means and controlled by the relative longitudinal movement of the auxiliary frame and main frame, incident to uncoupling of the tractor and trailer, for causing the temporary supporting means to be moved downwardly into operative load supporting position.

11. In a semi-trailer, the combination of a main frame, an auxiliary frame carried thereby and longitudinally movable relative thereto, means on the auxiliary frame for coupling the trailer to a tractor, said auxiliary frame being adapted for forward longitudinal movement in a substantially horizontal direction during uncoupling of the tractor and trailer, temporary supporting means carried by and movable relative to the auxiliary frame, and means associated with said temporary supporting means and controlled by the relative longitudinal movement of the auxiliary frame and main frame, incident to uncoupling of the tractor and trailer, for causing the temporary supporting means to be moved forwardly and downwardly relatively to the auxiliary frame to assume load-supporting position adjacent the front end of the trailer at a substantial distance forward of their inoperative position.

12. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer; temporary supporting means carried by and movable relative to the auxiliary frame, said means including leg members mounted for pivoting about their upper ends and adapted to assume upright position when moved to operative position, brace members connected to said leg members, and means associated with said brace members and responsive to the relative movement of the auxiliary frame and main frame, incident to uncoupling of the tractor and trailer, for causing said supporting legs to swing about their pivot axes to assume operative load-supporting position adjacent the front end of the trailer.

13. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer; temporary supporting means carried by and movable relative to the auxiliary frame, said means including leg members pivotally connected at their upper ends to said auxiliary frame, jointed brace members for controlling the movement of said legs about their pivots, and cam means including a part on the main frame and a cooperating part associated with the joint braces and responsive to the relative movement of the auxiliary frame and main frame, incident to uncoupling of the tractor and trailer, for positively moving said legs about their pivots into operative load-supporting position adjacent the front end of the trailer.

14. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer and adapted for return movement by the coupling of the tractor and trailer; temporary supporting means carried by and movable relative to the auxiliary frame, said means including leg members pivoted adjacent their upper ends to said auxiliary frame, jointed brace members connected to said legs for controlling their movement, said legs being adapted to assume upright load-supporting position adjacent the front end of the trailer when the tractor and trailer are uncoupled, and cam means including parts on the main frame and co-operating parts associated with the brace members and responsive to the relative movement of the auxiliary frame and main frame, incident to coupling of the tractor and trailer, for positively swinging the legs rearwardly for raising them out of operative position.

15. In the construction defined in claim 14, together with separate cam means including parts on the main frame and co-operating parts associated with the brace members, and responsive to the relative movement of the frames, incident to uncoupling of the tractor and trailer, for positively moving said leg members forwardly about their pivots into operative position adjacent the front end of the trailer.

16. In a semi-trailer including a main frame, an auxiliary frame carried thereby and longitudinally movable relative thereto, and means on the auxiliary frame for coupling the trailer to a tractor, said auxiliary frame being adapted for forward longitudinal movement relative to the main frame during uncoupling of the tractor and trailer; temporary supporting means carried on and bodily movable relative to the auxiliary frame, and means associated with said temporary supporting means and responsive to the relative longitudinal movement of the auxiliary frame and main frame, incident to uncoupling of the tractor and trailer, for positively shifting said temporary supporting means forwardly on the auxiliary frame to assume a position at the forward end of the trailer at a substantial distance forward of its position when disposed in inoperative position.

17. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer and adapted for return movement by the coupling of the tractor and trailer; temporary supporting means carried by and bodily movable relative to the auxiliary frame, said means including leg members mounted for pivotal movement about their upper ends, and means responsive to the relative movement of the auxiliary frame and main frame, incident to uncoupling of the tractor and trailer, for swinging said legs downwardly about their pivots and simultaneously moving them bodily forwardly relative to the auxiliary frame to assume operative load-supporting position adjacent the front end of the trailer at a substantial distance forward of the position normally assumed in inoperative position.

18. In the construction defined in claim 17, said last mentioned means including a flexible member fixedly connected at one end to the main frame, and its other end connected to the supporting means remote from the pivot of the legs, and a sheave wheel on the auxiliary frame around which said flexible member is trained.

19. In a semi-trailer including a main frame, an auxiliary frame carried thereby and longitudinally movable relative thereto, and means on the auxiliary frame for coupling the trailer to a tractor, said auxiliary frame being tiltable to assume an upwardly and forwardly inclined position during uncoupling of the tractor and trailer; temporary supporting means carried by and movable relative to the auxiliary frame, said means including leg members mounted for pivoting about their upper ends and adapted to assume upright position when moved to operative position, brace members connected to said leg members, and means cooperating with said brace members and responsive to the relative movement of the auxiliary frame and main frame, incident to uncoupling of the tractor and trailer, for causing said supporting legs to swing about their pivot axes to assume operative load-supporting position adjacent the front end of the trailer.

20. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer, and adapted for return movement by the coupling of the tractor and trailer; temporary supporting means carried by and bodily movable relative to the auxiliary frame, said means including leg members mounted for pivotal movement about their upper ends, means responsive to the relative movement of the auxiliary frame and main frame incident to uncoupling of the tractor and trailer for swinging said legs downwardly about their pivots and simultaneously moving them bodily forwardly relative to the auxiliary frame to assume operative load supporting position adjacent the front end of the trailer, and means responsive to the relative movement of the auxiliary frame and main frame incident to the coupling of the tractor and trailer for swinging said legs rearwardly and simultaneously moving them bodily on said auxiliary frame to inoperative position.

21. In the construction defined in claim 20, said separate means for actuating the legs to and from operative position comprising two sets of oppositely extending flexible cables each having one end secured to the main frame and the opposite ends secured to the supporting means remotely from the pivot of said legs, and two sets of sheave wheels secured to the auxiliary frame in longitudinally spaced apart relation fore-and-aft with respect to the range of movement of said supporting means, over which sheaves said sets of flexible cables are trained.

22. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer and adapted for return movement by coupling of the tractor and trailer, unitary supporting means carried by and bodily movable relative to the auxiliary frame, said means including a rigid triangular frame structure, one side of which comprises a supporting leg, a ground-engaging wheel carried at the lower end of said leg, a roller at the upper end of said leg arranged for longitudinal movement in a guideway of the auxiliary frame, and about the axis of which roller said triangular frame structure is adapted to swing, a roller journalled at the other corner of said triangular frame, means on the auxiliary frame having a downwardly inclined guideway in which said last mentioned roller is confined to move for controlling the forward and tilting movement of said unitary supporting means relative to the auxiliary frame, and means responsive to the relative movement of the auxiliary frame and main frame incident to uncoupling of the tractor and trailer for swinging said unitary supporting means downwardly about said roller axis while simultaneously moving it bodily forwardly on the auxiliary frame for disposing the same with the leg in substantially vertical operative load-supporting position adjacent the front end of the trailer.

23. In the construction defined in claim 22, means responsive to the relative movement of the auxiliary frame and main frame incident to coupling of the tractor and trailer for causing swinging of said unitary supporting structure in an upwardly direction about said pivot axis while simultaneously shifting said supporting structure rearwardly on the auxiliary frame to its inoperative position.

24. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer; temporary supporting means carried by and movable relative to the auxiliary frame, said means including leg members pivotally connected at their upper ends to said auxiliary frame, jointed brace members having their lower ends connected to the legs and their upper ends pivotally connected to the auxiliary frame, cam means on the main frame, and cooperating roller elements carried by the upper members of said braces, whereby movement of the auxiliary frame incident to uncoupling of the tractor and trailer causes the rollers to engage said cam means for positively forcing said braces in a downwardly direction to shift the legs about their pivots to operative load supporting position.

25. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer, and adapted for return movement by the coupling of the tractor and trailer; temporary supporting means carried by and movable relative to the auxiliary frame, said means including leg members pivotally connected at their upper ends to said auxiliary frame, jointed brace members having their lower ends connected to the legs and their upper ends pivotally connected to the auxiliary frame, cam means on the main frame, and cooperating roller elements carried by the upper members of said braces, whereby movement of the auxiliary frame incident to coupling of the tractor and trailer forcibly buckles the brace members and positively raises and swings said legs in a rearward direction about their pivots to inoperative position.

26. In a semi-trailer including a main frame, an auxiliary frame carried thereby and longitudinally movable relative thereto, and means on the auxiliary frame for coupling the trailer to a tractor, said auxiliary frame being adapted for forward movement relative to the main frame during uncoupling of the tractor and trailer, and adapted for return movement by the coupling of the tractor and trailer; temporary supporting means carried by and movable relative to the auxiliary frame, said means including leg members pivotally connected at their upper ends to said auxiliary frame, jointed brace members having their lower ends connected to the legs and their upper ends pivotally connected to the auxiliary frame, cam means on the main frame, and cooperating roller elements carried by the upper members of said braces, whereby movement of the auxiliary frame in a forward direction for uncoupling of the tractor and trailer causes the rollers to engage said cam means for positively forcing said braces to shift the legs to operative position, and additional cam means on said main frame adapted to be engaged by said roller elements during return movement of the auxiliary frame incident to coupling of the tractor and trailer for forcibly buckling the brace members and positively raising and swinging the legs rearwardly about their pivots to inoperative position.

27. In the construction defined in claim 26, said last mentioned cam means having its effective surface shaped so that in response to the forward movement of the auxiliary frame incident to uncoupling of the tractor and trailer said supporting legs will tend to swing downwardly to operative position under the influence of gravity.

28. In a semi-trailer, the combination of a main frame, an auxiliary frame carried thereby and longitudinally movable relative thereto, means on the auxiliary frame for coupling the trailer to a tractor, said auxiliary frame being tiltable to assume an upwardly and forwardly inclined position during uncoupling of the tractor and trailer, means for guiding the rear end of the auxiliary frame throughout its range of tilting movement, temporary supporting means carried by and movable relative to the auxiliary frame, said means including leg members pivotally connected at their upper ends to said auxiliary frame, jointed brace members having their lower ends connected to said legs and their upper ends pivotally connected to the auxiliary frame, cam means rigidly associated with said guide means, and cooperating roller elements carried by the upper members of said braces, whereby the return movement of said tilted auxiliary frame causes said roller elements to engage said cam means for causing forcible buckling of said brace members, and thereby raises and swings said legs rearwardly about their pivots to inoperative position.

29. In the construction defined in claim 28, said cooperating roller elements comprising a plurality of rollers spaced along each of said upper brace members, and adapted to engage said cam means in sequence for gradually and positively causing raising and swinging of said legs to inoperative position.

30. The combination with a tractor, a semi-trailer having a main frame, an auxiliary frame carried thereby and longitudinally movable relative thereto, and a fifth wheel for swivelly supporting one end of the trailer on the tractor, including a lower member mounted on the tractor and an upper member carried on the trailer, said auxiliary frame being adapted for forward longitudinal movement relatively to the main frame during uncoupling of the tractor and trailer; of temporary supporting means carried by and movable relatively to the auxiliary frame, and means associated with the temporary supporting means and controlled by the relative movement of the auxiliary frame and main frame incident to uncoupling of the tractor and trailer for positively shifting the temporary supporting means forwardly relative to the auxiliary frame to assume a position adjacent the forward end of the trailer at a substantial distance forward of its position when disposed in inoperative position.

31. In a semi-trailer including a main frame, an auxiliary frame telescopically associated with said main frame, and means on the auxiliary frame for coupling the trailer to a tractor, said auxiliary frame being adapted for bodily forwardly extensible movement relative to and partially beyond the front end of the main frame during uncoupling of the tractor and trailer; temporary supporting means bodily carried on and movable relative to the auxiliary frame, and means associated with the temporary supporting means and responsive to the extensible relative movement of the auxiliary frame and main frame incident to uncoupling of the tractor and trailer for positively shifting the supporting means forwardly relative to the auxiliary frame to assume a position adjacent the forward end of the trailer.

ANTHONY W. MOLINARE.